United States Patent
Kim et al.

(10) Patent No.: US 7,269,311 B2
(45) Date of Patent: Sep. 11, 2007

(54) REMOTE ANTENNA UNIT AND WAVELENGTH DIVISION MULTIPLEXING RADIO-OVER-FIBER NETWORK

(75) Inventors: Yong-Gyoo Kim, Seoul (KR); Gyu-Woong Lee, Suwon-si (KR); Seong-Taek Hwang, Pyeongtaek-si (KR)

(73) Assignee: Samsung Electronics Co., Ltd., Suwon-Si, Gyeonggi-Do, Korea (KR)

( * ) Notice: Subject to any disclaimer, the term of this patent is extended or adjusted under 35 U.S.C. 154(b) by 0 days.

(21) Appl. No.: 11/398,324

(22) Filed: Apr. 4, 2006

(65) Prior Publication Data

US 2006/0222369 A1    Oct. 5, 2006

(30) Foreign Application Priority Data

Apr. 4, 2005    (KR) .................... 10-2005-0028147

(51) Int. Cl.
*G02B 6/26*    (2006.01)
(52) U.S. Cl. ........................... 385/24; 398/115
(58) Field of Classification Search .................. None
See application file for complete search history.

(56) References Cited

U.S. PATENT DOCUMENTS

2002/0012495 A1 * 1/2002 Sasai et al. .................. 385/24
2003/0118280 A1 * 6/2003 Miyazaki et al. ............. 385/24
2004/0001719 A1 * 1/2004 Sasaki .......................... 398/115
2006/0062579 A1 * 3/2006 Kim et al. .................... 398/115

OTHER PUBLICATIONS

A. Stohr et al. Full-duplex fiber-optic RF subcarrier transmission using a dual-function modulator / photodetector. IEEE Transactions on Microwave Theory and Techniques, vol. 47, No. 7, pp. 1338-1341, Jul. 1999.*

* cited by examiner

*Primary Examiner*—Rodney Bovernick
*Assistant Examiner*—Mike Stahl
(74) *Attorney, Agent, or Firm*—Cha & Reiter, LLC (57) ABSTRACT

Disclosed is a remote antenna unit and a wavelength division multiplexing network. The remote antenna unit includes: an optical circulator having a plurality of ports; an electric field absorption modulator having a first input/output end and a second reflective end, the electric field absorption modulator configured to demodulate an optical signal into a first data signal, and modulate the demodulated optical signal according to a second electric data signal; and a filter disposed between the optical circulator and the electric field absorption modulator, for the filter configured to transmit an optical signal having a particular wavelength from among optical signals input from a port of the optical circulator toward the electric field absorption modulator and reflecting the remaining optical signals into the port of the optical circulator, and inputting the optical signal from the electric field absorption modulator into the port of the optical circulator.

12 Claims, 5 Drawing Sheets

REMOTE ANTENNA UNIT AND WAVELENGTH DIVISION MULTIPLEXING RADIO-OVER-FIBER NETWORK

CLAIM OF PRIORITY

This application claims priority to an application entitled "Remote Antenna Unit and Wavelength Division Multiplexing Radio-Over-Fiber Network Using the Same" filed with the Korean Intellectual Property Office on Apr. 4, 2005 and assigned Serial No. 2005-0028147, the contents of which is incorporated herein by reference.

BACKGROUND OF THE INVENTION

1. Field of the Invention

The present invention relates to an optical network, and more particularly to a wavelength division multiplexing radio-over-fiber network that supports bidirectional wireless communication.

2. Description of the Related Art

A radio-over-fiber network transmits radio signals through optical fibers. In particular, an optical transmitter converts radio signals into optical signals and transmits the optical signals through the optical fibers. An optical receiver converts optical signals received through the optical fibers into radio signals. When wavelength division multiplexing is applied to such a radio-over-fiber network, radio signals for a plurality of remote antenna units can be transmitted through one optical fiber. Thus, such a system effectively uses the broadband width of the optical fiber.

Moreover, the wavelength division multiplexing radio-over-fiber network allows complicated electric devices dispersed in a plurality of base stations to be concentrated in a central office. In turn, a small number of optical fibers can be used because of the wavelength division multiplexing scheme.

Figure 1:
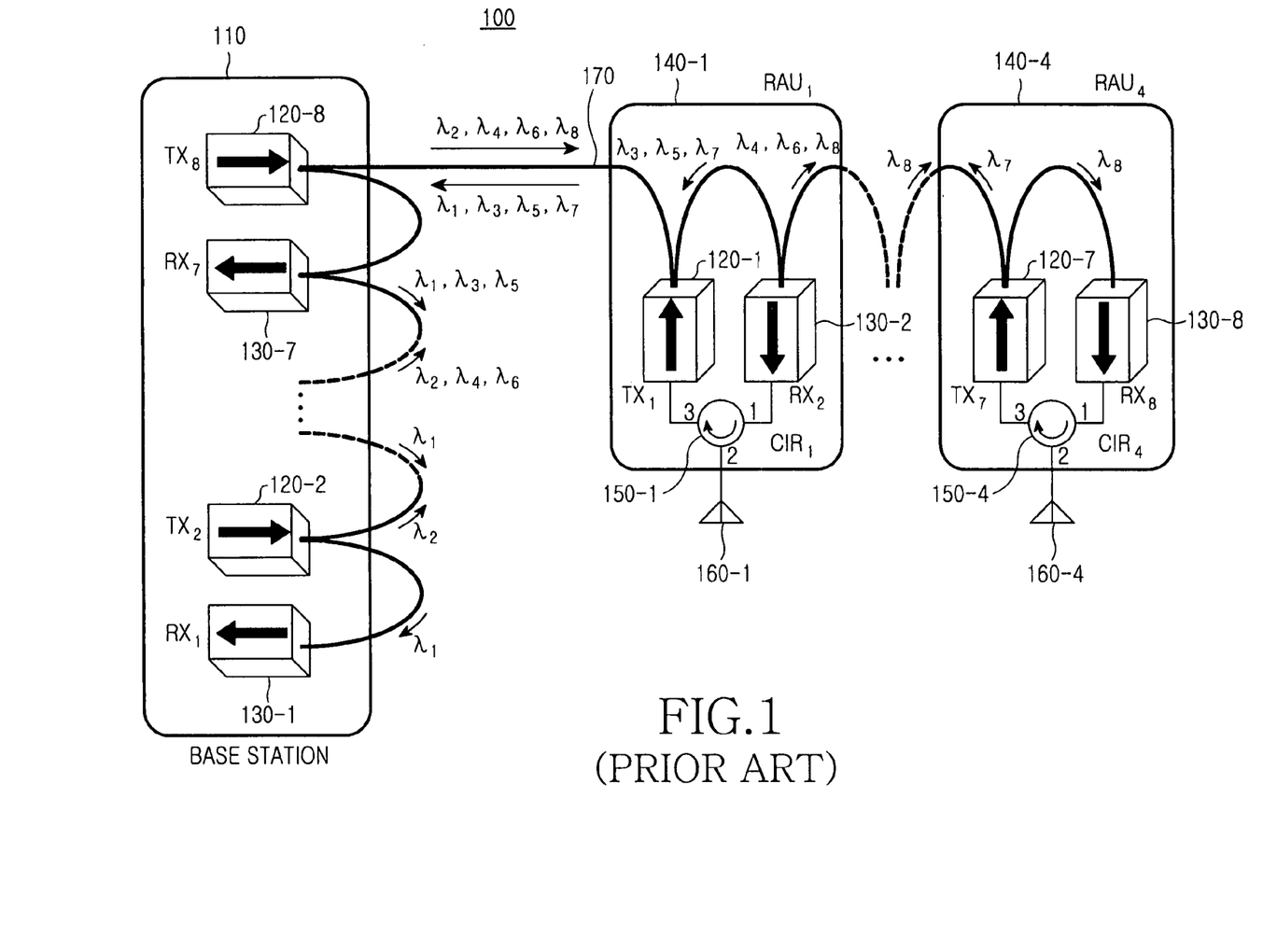
FIG. 1 is a block diagram of a conventional wavelength division multiplexing radio-over-fiber network.

FIG. 1 is a block diagram of a conventional wavelength division multiplexing radio-over-fiber network. The radio-over-fiber network 100 includes a base station 110, and first, second, third, and fourth remote antenna units 140-1, 140-2, 140-3, and 140-4 connected in series to the base station 110 through an optical fiber 170.

The base station 110 includes second, fourth, sixth, and eighth optical transmitters 120-2, 120-4, 120-6, and 120-8, and first, third, fifth, and seventh optical receivers 130-1, 130-3, 130-5, and 130-7. As the index i increases in an order of 1, 3, 5, 7, ..., the $i^{th}$ optical receiver 130-$i$ and the $(i+1)^{th}$ optical transmitter 130-$(i+1)$ are alternately arranged and connected to one another in series. The $(i+1)^{th}$ optical transmitter 130-$(i+1)$ downwardly transmits $(i+1)^{th}$ optical signal $\lambda_{i+1}$ having $(i+1)^{th}$ wavelength. The $i^{th}$ optical receiver 130-$i$ receives an $i^{th}$ optical signal $i^{th}$ having an $i^{th}$ wavelength. Herein, the word "downstream" indicates a direction from the base station 110 to the remote antenna units 140-1, 140-2, 140-3, and 140-4, while the term "upstream" means the direction opposite to the downstream. The optical transmitters 120-2, 120-4, 120-6, and 120-8 pass the inputted optical signal therethrough. The optical receivers 130-1, 130-3, 130-5, and 130-7 receive the optical signal assigned to each optical receiver and pass the rest of the optical signals therethrough. For example, the first optical signal inputted into the base station 110 passes through the eighth, sixth, fourth, and second optical transmitters and the seventh, fifth, and third optical receivers alternately and in order, and then is received by the first optical receiver 130-1. On the other hand, the second optical signal outputted from the second optical transmitter 120-2 passes through the third, fifth, and seventh optical receivers and the fourth, sixth, and eighth optical transmitters alternately and in order, and then is downstream transmitted.

The first, second, third, and fourth remote antenna units 140-1, 140-2, 140-3, and 140-4 have structures identical to one another. The $j^{th}$ remote antenna unit 140-j includes a $(2j-1)^{th}$ optical transmitter 120-(2j-1), a $(2j)^{th}$ optical receiver 130-2j, a $j^{th}$ circulator 150-j, and a $j^{th}$ antenna 160-j, wherein the index j is a natural number below four.

The $(2j-1)^{th}$ optical transmitter 120-(2j-1) upstream transmits the $(2j-1)^{th}$ optical signal $\lambda_{(2j-1)}$ created by electric data signal which is inputted from the $j^{th}$ circulator 150-j.

The $(2j)^{th}$ optical receiver 130-2j converts the $(2j)^{th}$ optical signal $\lambda_{(2j)}$ passing through the $(2j-1)^{th}$ optical transmitter 120-(2j-1) into electric data signal, and then outputs the electric data signal.

The $j^{th}$ circulator 150-j has first, second, and third ports. The first port of the $j^{th}$ circulator 150-j is connected to the $(2j)^{th}$ optical receiver 130-2j, the second port of the $j^{th}$ circulator 150-j is connected to the $j^{th}$ antenna 160-j, and the third port is connected to the $(2j-1)^{th}$ optical transmitter 120-(2j-1). The $j^{th}$ circulator 150-j outputs electric data signal inputted into the first port to the second port, and outputs the electric data signal inputted into the second port to the third port.

The $j^{th}$ antenna 160-j converts radio signals received through the air into electric data signals, and then outputs the electric data signals to the $j^{th}$ circulator 150-j. Moreover, the $j^{th}$ antenna 160-j converts electric data signals inputted from the $j^{th}$ circulator 150-j into radio signals, and then emits the radio signals to the air.

The optical transmitters 120-1, 120-3, 120-5, and 120-7 pass the optical signals respectively inputted into the optical transmitters. The optical receivers 130-2, 130-4, 130-6, and 130-8 receive the optical signals assigned to each receiver and pass the rest of optical signals therethrough as they are. For example, the eighth optical signal $\lambda_8$ passes through the first, third, fifth, and seventh optical transmitters and the second, fourth, and sixth optical receivers alternately and in order, and then is received by the eighth optical receiver 130-8. On the other hand, the seventh optical signal $\lambda^7$ outputted from the seventh optical signal 120-7 passes through the sixth, fourth, and second optical receivers and the fifth, third, and first optical transmitters alternately and in order, and then is transmitted upstream.

The first to eighth optical transmitters 120-1, 120-2, ..., and 120-8 have identical structures. The first to eighth optical receivers 130-1, 130-2, ..., and 130-8 also have identical structures.

Figure 2:
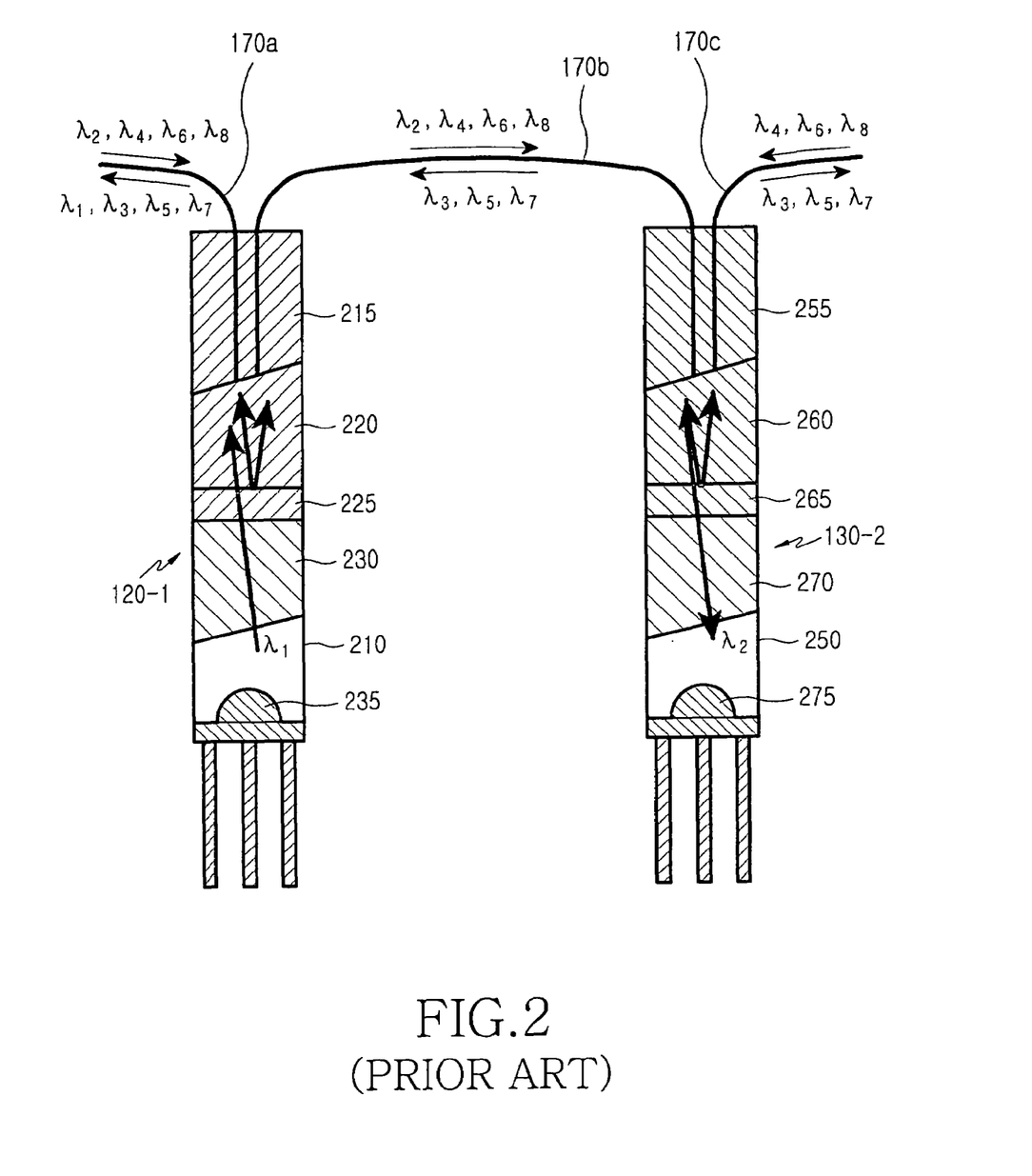
FIG. 2 illustrates a first optical transmitter and a second optical receiver included in a first remote antenna unit shown in FIG. 1.

FIG. 2 illustrates a first optical transmitter 120-1 and a second optical receiver 130-2 included in a first remote antenna unit 140-1 shown in FIG. 1.

The first optical transmitter 120-1 includes a first housing 210, a first ferrule 215, first and second lenses 220 and 230, a first filter 225, and laser diode 235.

The first housing 210 has a cylindrical shape in which the upper and lower ends are open.

The first ferrule 215 is inserted into an upper portion of the first housing 210, and has a pair of holes into which a part of an upstream optical fiber 170 and an intermediate optical fiber 170b are inserted. The second, fourth, sixth, and eighth optical signals $\lambda_2$, $\lambda_4$, $\lambda_6$ and $\lambda_8$ are inputted into the first optical transmitter 120-1 through the upstream optical fiber 170a. The first, third, fifth, and seventh optical signals $\lambda_1$, $\lambda_3$, $\lambda_5$, and $\lambda_7$ are outputted outside the first optical transmitter 120-1. Moreover, the third, fifth, and seventh optical signals $\lambda_3$, $\lambda_5$, and $\lambda_7$ are inputted into the first optical transmitter 120-1 through the intermediate optical fiber 170b, while the second, fourth, sixth, and eighth optical signals $\lambda_2$, $\lambda_4$, $\lambda_6$, and $\lambda_8$ are outputted outside the first optical transmitter 120-1.

The first filter 225 is disposed at an intermediate portion of the first housing 210. The first filter 225 reflects the optical signals inputted from the upstream optical fiber or the intermediate optical fiber 170a or 170b toward the intermediate optical fiber or the upstream optical fiber 170b or 170a. The first filter 225 also transmits the first optical signal inputted from the laser diode 235 toward the upstream optical fiber 170a.

The first lens 220 is interposed between the first ferrule 215 and the first filter 225. The first lens 220 enables the first, third, fifth, and seventh optical signals to converge at an end of the upstream optical fiber 170a.

The laser diode 235 is disposed at a lower portion of the first housing 210. The laser diode 235 converts the electric data signals inputted from the first circulator 150-1 into the first optical signals and then outputs the first optical signals.

The second lens 230 is interposed between the laser diode 235 and the first filter 225. The second lens 230 makes the first optical signals converge at an end of the upstream optical fiber 170a.

The second optical receiver 130-2 includes a second housing 250, a second ferrule 255, third and fourth lenses 260 and 270, a second filter 265, and a photodiode 275.

The second housing 250 has a cylindrical shape in which upper and lower ends are open.

The second ferrule 255 is inserted into an upper portion of the second housing 250. The second ferrule 255 has a pair of holes into which a part of a downstream optical fiber 170c and the intermediate optical fiber 170b are inserted. The second, fourth, sixth, and eighth optical signals are inputted into the second optical receiver 130-2 through the intermediate optical fiber 170b, while the third, fifth, and seventh optical signals are outputted outside of the second optical receiver 130-2. Moreover, the third, fifth, and seventh optical signals are inputted into the second optical receiver 130-2 through the downstream optical fiber 170c, and the fourth, sixth, and eighth optical signals are outputted outside of the second optical receiver 130-2.

The second filter 265 is disposed at an intermediate portion of the second housing 250. The second filter 265 transmits only the second optical signal among the optical signals inputted from the intermediate optical fiber 170b toward the photodiode 275. The second filter 265 also reflects the remaining optical signals toward the downstream optical fiber 170c. Furthermore, the second filter 265 reflects the optical signals inputted from the downstream optical fiber 170c toward the intermediate optical fiber 170b.

The third lens 260 is interposed between the second ferrule 255 and the second filter 265. The third lens 260 enables the optical signals reflected by the second filter 265 to converge at an end of the corresponding optical fiber.

The photodiode 275 converts the second optical signal inputted from the second filter 265 into electric data signal, and then outputs the electric data signal.

The fourth lens 270 is interposed between the photodiode 275 and the second filter 265. The fourth lens 270 enables the second optical signal to converge into a light receiving portion of the photodiode 275.

However, the conventional wavelength division multiplexing radio-over-fiber network 100 described above has a number of limitations.

For example, since each remote antenna unit has an optical transmitter and an optical receiver, the identical structural devices are repeatedly applied to the remote antenna unit. Thus, the network is complicated and the cost of realizing the network is increased.

Further, the upstream wavelength band and downstream wavelength band must be separate, thereby decreasing the efficient use of the wavelength band.

SUMMARY OF THE INVENTION

Accordingly, the present invention has been made to reduce or overcome the above-mentioned problems occurring in the prior art and provides additional advantages, by providing a remote antenna unit that has a simple structure and a lower cost for realizing the remote antenna unit.

Another object of the present invention is to provide a wavelength division multiplexing radio-over-fiber network which can increase the efficiency of the wavelength band using the remote antenna unit.

According to the first embodiment of the present invention, a remote antenna unit is provided. The remote antenna unit includes an optical circulator having a plurality of ports; an electric field absorption modulator having a first input/output end and a second reflective end, the electric field absorption modulator configured to demodulate an optical signal into a first data signal and modulate the demodulated optical signal according to a second electric data signal; and a filter disposed between the optical circulator and the electric field absorption modulator, the filter configured to transmit an optical signal having a particular wavelength from among optical signals input from a port of the optical circulator toward the electric field absorption modulator and reflecting the remaining optical signals into the port of the optical circulator, and input the optical signal from the electric field absorption modulator into the port of the optical circulator.

According to the another aspect of the present invention, there is provided a radio-over-fiber network which comprises: a base station including an optical transmission portion for transmitting downstream optical signals having different wavelengths, and an optical reception portion for receiving upstream optical signals having different wavelengths; and a plurality of remote antenna units connected sequentially to the base station through optical fibers so as to be in a loop structure, each remote antenna unit which includes: an optical circulator having a plurality of ports; an electric field absorption modulator having a first input/output end and a second reflective end, the electric field absorption modulator configured to demodulate an optical signal into a first data signal and modulate the demodulated optical signal according to a second electric data signal; and a filter disposed between the optical circulator and the electric field absorption modulator, the filter configured to transmit an optical signal having a particular wavelength from among optical signals input from a port of the optical circulator toward the electric field absorption modulator and reflecting the remaining optical signals into the port of the optical circulator, and input the optical signal from the electric field absorption modulator into the port of the optical circulator.

BRIEF DESCRIPTION OF THE DRAWINGS

The present invention will be more apparent from the following detailed description taken in conjunction with the accompanying drawings, in which.

DETAILED DESCRIPTION

Hereinafter, embodiments of the present invention will be described in detail with reference to the accompanying drawings. For the purposes of clarity and simplicity, a detailed description of known functions and configurations incorporated herein will be omitted to avoid making the subject matter of the present invention unclear.

Figure 3:
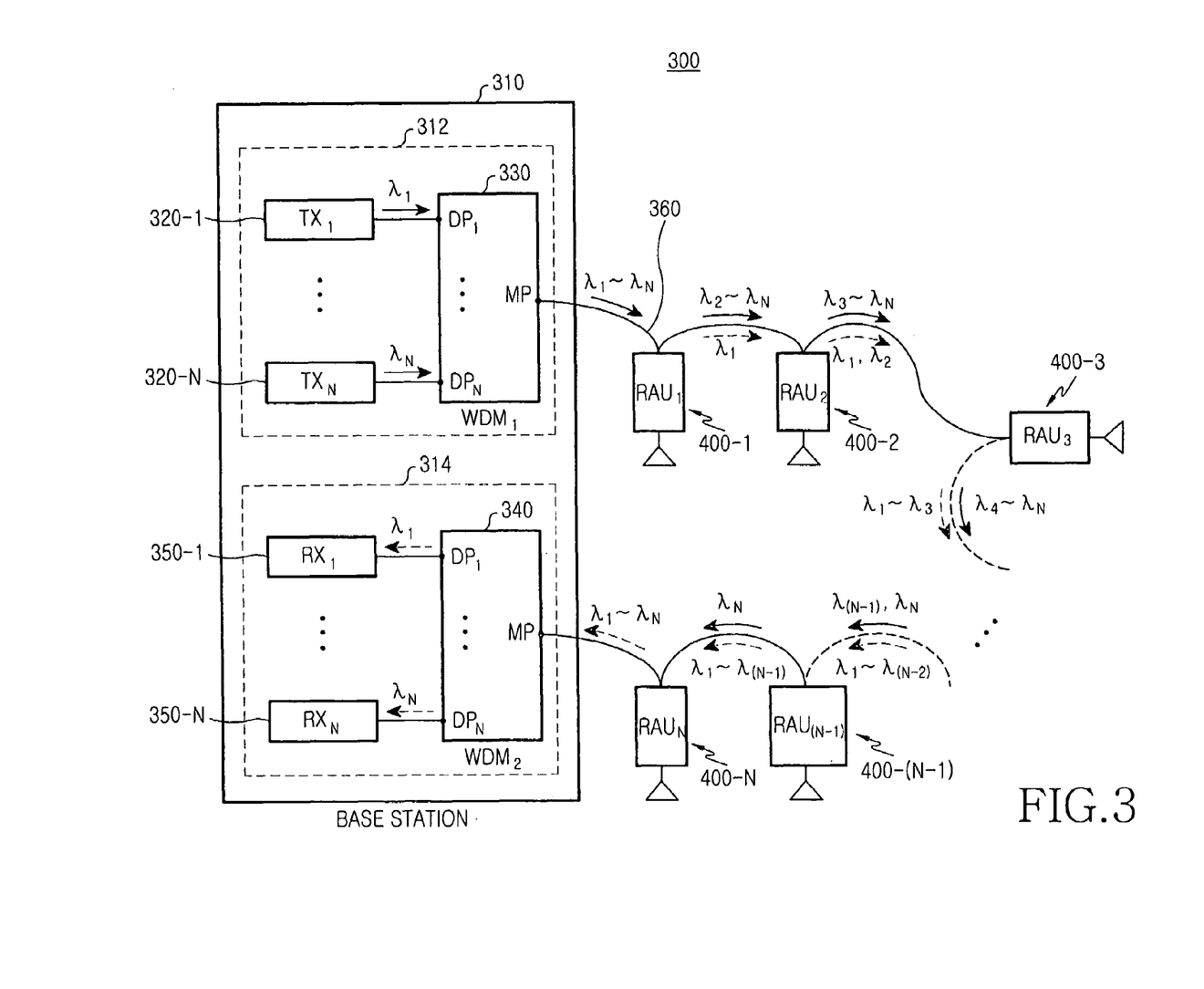
FIG. 3 is a block diagram of a wavelength division multiplexing radio-over-fiber network according to a preferred embodiment of the present invention.

FIG. 3 is a block diagram of a wavelength division multiplexing radio-over-fiber network according to a preferred embodiment of the present invention. The radio-over-fiber network 300 includes a base station 310, and first, second, third, . . . , and $N^{th}$ remote antenna units 400-1, 400-2, 400-3, . . . , and 400-N connected to the base station 310 through an optical fiber 360 in order and in a loop structure.

The base station 310 includes an optical transmission portion 312 having first, second, third, . . . , and $N^{th}$ optical transmitters 320-1, 320-2, 320-3, . . . , 320-N and a first wavelength division multiplexer 330, and an optical reception portion 314 having first, second, third, . . . , and $N^{th}$ optical receivers 350-1, 350-2, 350-3, . . . , and 350-N and a second wavelength division multiplexer 340.

The first, second, third, . . . , and $N^{th}$ optical transmitters 320-1, 320-2, 320-3, . . . , and 320-N have identical or similar structures with one another, and outputs first, second, third, . . . , and $N^{th}$ downstream optical signals $\lambda_1$, $\lambda_2$, $\lambda_3$, . . . , and $\lambda_N$ (indicated by a solid line) having different wavelengths. The $m^{th}$ optical transmitter 320-m outputs m upstream optical signal $\lambda_m$ having an $m^{th}$ wavelength which is modulated by m electric data signal, wherein the m is a natural number below N. The first, second, third, . . . , and $N^{th}$ wavelengths are spaced at a given distance from one another. The first, second, third, . . . , and $N^{th}$ optical transmitters 320-1, 320-2, 320-3, . . . , and 320-N can respectively use a laser diode.

The first wavelength multiplexer 330 is provided with first, second, third, . . . , and $N^{th}$ demultiplexing ports and a multiplexing port. The first, second, third, . . . , and $N^{th}$ demultiplexing ports are connected by point to point to the first, second, third, . . . , and $N^{th}$ optical transmitters 320-1, 320-2, 320-3, . . . , and 320-N one by one. The multiplexing port is connected through the optical fiber 360 to the first remote antenna unit 400-1. The first wavelength division multiplexer 330 performs the wavelength division multiplexing relative to the first, second, third, . . . , and $N^{th}$ downstream optical signals inputted into the first, second, third, . . . , and $N^{th}$ demultiplexing ports, and then outputs the multiplexed downstream optical signals to the multiplexing port. At this time, the $m^{th}$ downstream optical signal is inputted into the $m^{th}$ demultiplexing port of the first wavelength division multiplexer 330. 1×N arranged waveguide gratings may be used as the first and second wavelength division multiplexers 330 and 340.

The second wavelength division multiplexer 340 has first, second, third, . . . , $N^{th}$ demultiplexing ports and a multiplexing port. The first, second, third, . . . , and $N^{th}$ demultiplexing ports are point-to-point connected to the first, second, third, . . . , and $N^{th}$ optical receivers 350-1, 350-2, 350-3, . . . , and 350-n one by one. The multiplexing port is connected to the $N^{th}$ remote antenna unit 400-N through the optical fiber 360. The second wavelength division multiplexer 340 performs the wavelength division demultiplexing with relation to the first, second, third, . . . , and $N^{th}$ upstream optical signals $\lambda_1$, $\lambda_2$, $\lambda_3$, . . . , and $\lambda_N$ (indicated by a dotted line), and then outputs the demultiplexed upstream optical signals toward the first, second, third, . . . , and $N^{th}$ demultiplexing ports. At this time, the second wavelength division multiplexer 340 outputs the $m^{th}$ upstream optical signal toward the $m^{th}$ demultiplexing port.

The first, second, third, . . . , and $N^{th}$ optical receivers 350-1, 350-2, 350-3, . . . , and 350-N have identical or similar structures, which respectively convert the inputted upstream optical signals into electric data signals and then output the electric data signals. The $m^{th}$ optical receiver 350-m converts the $m^{th}$ upstream optical signal inputted therein into $(m')^{th}$ electric data signal, and then outputs the $(m')^{th}$ data signal. Photodiodes may be used as the first, second, third, . . . , and $N^{th}$ optical receivers 350-1, 350-2, 350-3, . . . , and 350-N, respectively.

The first, second, third, . . . , and $N^{th}$ remote antenna units 400-1, 400-2, 400-3, . . . , and 400-N have an identical or similar structures, i.e. loop structure, and are connected to the base station 310. The downstream transmission from the base station 310 and the upstream transmission to the base station 310 are performed along the optical fiber 360 in an identical direction. That is, the downstream optical signals and the upstream optical signals propagating in the optical fiber 360 are transmitted in an identical direction. The base station 310 transmits the first, second, third, . . . , and $N^{th}$ downstream optical signals toward the first remote antenna unit 400-1 while receiving the first, second, third, . . . , and $N^{th}$ upstream optical signals from the $N^{th}$ remote antenna unit 400-N. For example, the $N^{th}$ downstream optical signal passes through the first, second, third, . . . , and $(N-1)^{th}$ remote antenna units 400-1, 400-2, 400-3, . . . , and 400-(N−1) in order, and then is received by the $N^{th}$ remote antenna unit 400-N. The first upstream optical signal passes through the second, third, fourth, . . . , and $N^{th}$ remote antenna units 400-2, 400-3, 400-4, . . . , and 400-N in order, and then is received by the base station 310. Specifically, the $m^{th}$ downstream optical signal passes through the $m^{-1}$ pieces of the remote antenna units in order, and then is received by the $m^{th}$ remote antenna unit 400-m. The upstream optical signal outputted from the $m^{th}$ remote antenna unit 400-m passes through the N-m pieces of the remote antenna units in order, and then is received by the base station 310.

Figure 4:
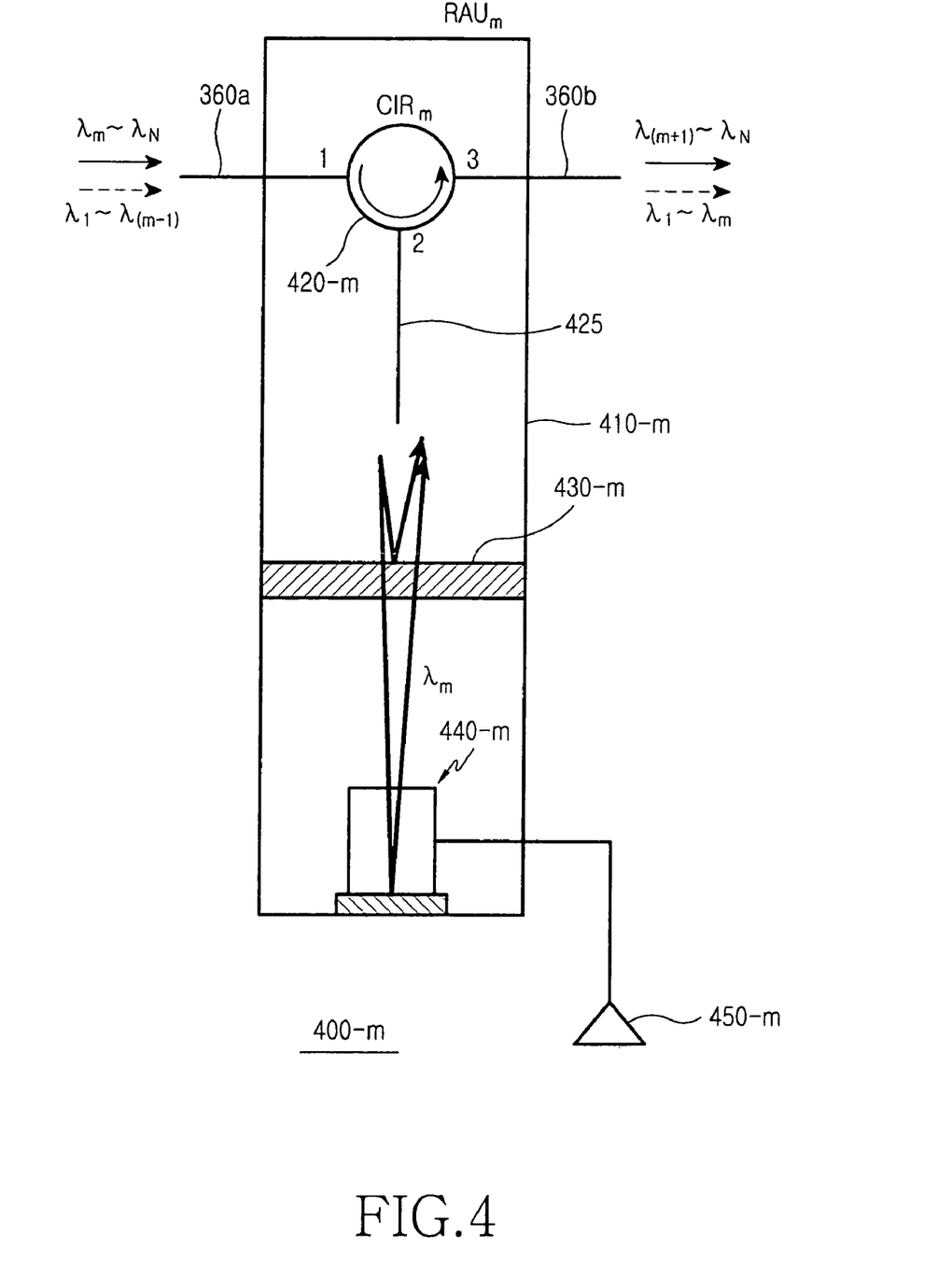
FIG. 4 illustrates an m remote antenna unit shown in FIG. 3.

FIG. 4 illustrates the $m^{th}$ remote antenna unit 400-m. The $m^{th}$ remote antenna unit 400-m includes an $m^{th}$ housing 410-m, an $m^{th}$ optical circulator 420-m, an $m^{th}$ filter 430-m, an $m^{th}$ electric field absorption modulator 440-m, and an $m^{th}$ antenna 450-m. The $m^{th}$ housing 410-m has a cylindrical structure in which upper and lower ends are closed, and has a pair of holes formed on a peripheral surface thereof into which an upstream optical fiber 360a and a downstream optical fiber 360b are partially inserted.

The $m^{th}$ optical circulator 420-m is disposed at an upper portion of the $m^{th}$ housing 410-m, which has the first, second, and third ports. The first port of the $m^{th}$ optical circulator 420-m is connected to the upstream optical fiber 360a, the second port is connected to an auxiliary optical fiber 425, and the third port is connected to the downstream optical fiber 360b. The $m^{th}$ optical circulator 420-m is a device without dependence on the wavelength of the optical signal and outputs the optical signal inputted into the first port toward the second port and outputs the optical signal inputted into the second port toward the third port. The $m^{th}$, $(m+1)^{th}$, $(m+2)^{th}$, ..., and $N^{th}$ downstream optical signals and the first, second, third, ..., and $(m-1)^{th}$ upstream optical signals are inputted into the first port of the $m^{th}$ optical circulator 420-m, and then are outputted toward the second port. Meanwhile, the $(m+1)^{th}$, $(m+2)^{th}$, $(m+3)^{th}$, ..., and $N^{th}$ downstream optical signals and the first, second, third, ..., and $m^{th}$ upstream optical signals are inputted into the second port, and then are outputted toward the third port. At this time, if the index m is one, no upstream optical signal is inputted into the first port. If the index m is two, no downstream optical signal is inputted into the second port.

The $m^{th}$ filter 430-m is disposed at an intermediate portion of the $m^{th}$ housing 410-m. The $m^{th}$ filter 430-m transmits the $m^{th}$ downstream optical signal among the optical signals inputted from the auxiliary optical fiber 425 toward the $m^{th}$ electric field absorption modulator 440-m and reflects the rest of optical signals toward the auxiliary optical fiber 425. Moreover, the $m^{th}$ filter 430-m transmits the $m^{th}$ upstream optical signal inputted from the $m^{th}$ electric field absorption modulator 440-m toward the auxiliary optical fiber 425. A thin film filter, in which a plurality of thin films are deposited on a glass substrate, may be used as the $m^{th}$ filter 430-m.

The $m^{th}$ electric field absorption modulator 440-m is disposed at a lower portion of the $m^{th}$ housing 410-m. The $m^{th}$ electric field absorption modulator 440-m demodulates the $m^{th}$ downstream optical signal inputted from the $m^{th}$ filter 430-m into the $m^{th}$ electric data signal so as to output the demodulated electric data signal. Moreover, the $m^{th}$ electric field absorption modulator 440-m outputs the $m^{th}$ upstream optical signal, which is inputted from the $m^{th}$ antenna 450-m and is modulated into the $(m')^{th}$ electric data signal, toward the $m^{th}$ filter 430-m.

Figure 5:
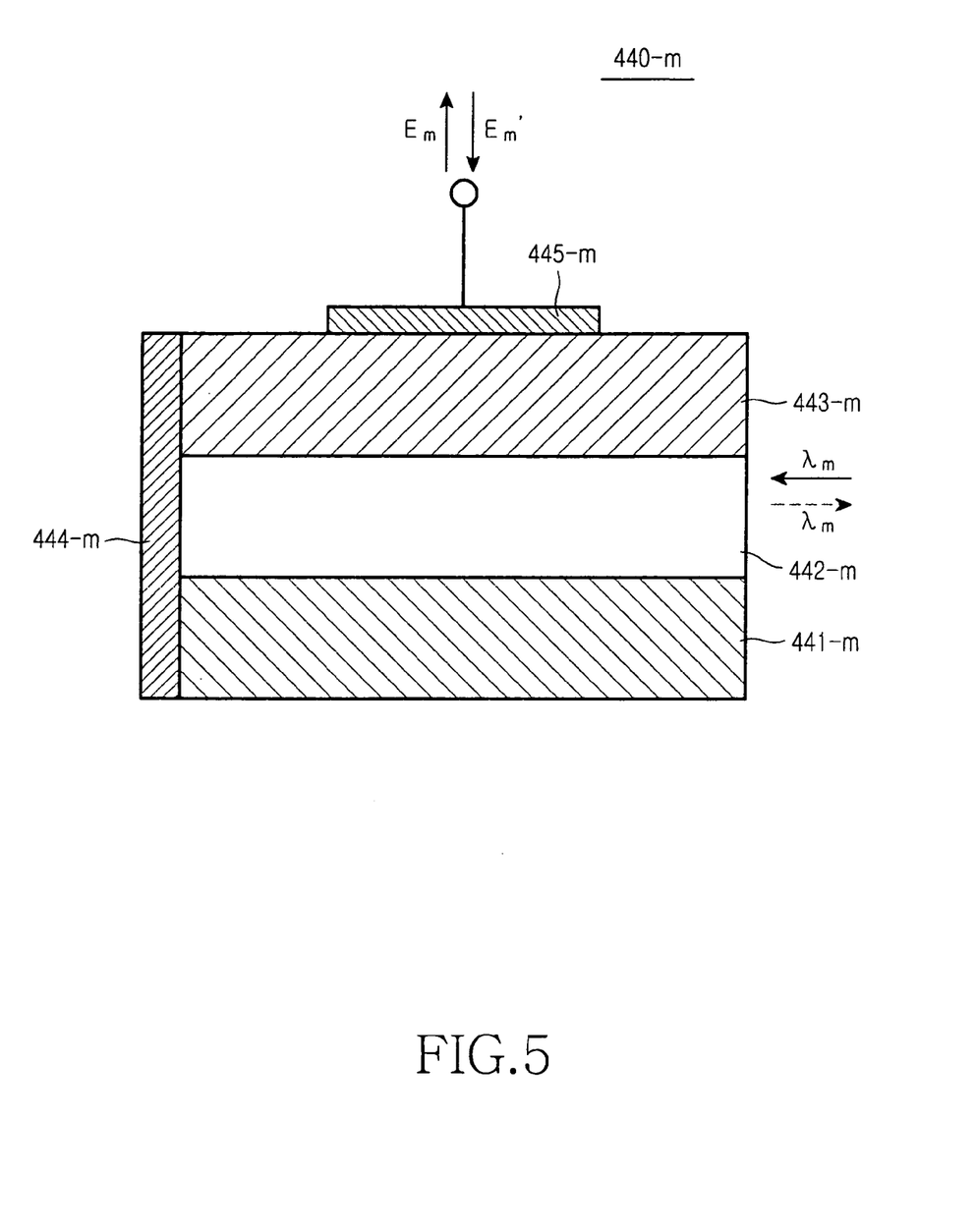
FIG. 5 illustrates an m electric field absorption modulator shown in FIG. 4.

FIG. 5 illustrates the $m^{th}$ electric field absorption modulator 440-m shown in FIG. 4. The $m^{th}$ electric absorption modulator 440-m is a reflective type, which includes upper and lower clad layers 441-m and 443-m, an active layer 442-m, an electrode 445-m, and a reflective layer 444-m.

The upper and lower clad layers 441-m and 443-m perform a locking function of the optical signal in the active layer 442-m. The active layer 442-m is interposed between the upper and lower clad layers 441-m and 443-m, into which the optical signal propagates. The reflective layer 444-m is stacked on a second side end of the $m^{th}$ electric field absorption modulator 440-m and reflects the inputted optical signal again. The electrode 445-m is stacked on the upper clad layer 443-m and is used as an input/output passage of the electric data signal. The first side end of the m electric field absorption modulator 440-m becomes an input/output passage for the optical signal. The $m^{th}$ electric field absorption modulator 440-m demodulates the $m^{th}$ downstream optical signal, into the $m^{th}$ electric data signal EM. The $m^{th}$ downstream optical signal has an optical carrier frequency and sidebands arranged in periodic intervals on both sides of the downstream optical signal. The $m^{th}$ electric data signal is carried on the sidebands. The $m^{th}$ electric data signal, which is generated by the $m^{th}$ downstream optical signal from the $m^{th}$ electric field absorption modulator 440-m, is outputted through the electrode 445-m outside. The $m^{th}$ electric field absorption modulator modulates the optical carrier frequency using the $(m')^{th}$ electric data signal Em' applied to the electrode and then outputs the modulated optical carrier frequency. At this time, it is preferred to set the frequency of the m electric data signal different from the frequency of the $(m')^{th}$ electric data signal.

Referring to FIG. 4 again, the $m^{th}$ antenna 450-m converts the radio signal received through the air into the $(m')^{th}$ electric data signal, while converting the $m^{th}$ electric data signal inputted from the $m^{th}$ electric field absorption modulator 400-m into a radio signal so as to emit the radio signal to the air.

As described above, the remote antenna unit according to the present invention is provided with the optical circulator, the filter, and the reflective electric field absorption modulator. Thus the remote antenna unit has a simple structure and the lower cost of realization.

Furthermore, in the wavelength division multiplexing radio-over-network using the remote antenna unit, identical wavelengths are repeatedly used for the upstream and downstream transmissions, so as to improve the efficiency of the wavelength bands in comparison with the conventional radio-over-network.

While the invention has been shown and described with reference to the preferred embodiments thereof, it will be understood by those skilled in the art that various changes in form and details may be made therein without departing from the spirit and scope of the invention as defined by the appended claims.

What is claimed is:

1. A remote antenna unit comprising:
an optical circulator having plurality of ports;
an electric field absorption modulator having a first input/output end and a second reflective end, the electric field absorption modulator configured to demodulate an optical signal into a first data signal and modulate the demodulated optical signal according to a second electric data signal; and
a filter disposed between the optical circulator and the electric field absorption modulator, the filter configured to transmit an optical signal having a particular wavelength from among optical signals input from a port of the optical circulator toward the electric field absorption modulator and reflecting the remaining optical signals into the port of the optical circulator, and input the optical signal from the electric field absorption modulator into the port of the optical circulator.

2. The remote antenna unit as claimed in claim 1, wherein the optical circulator has a first, second, and third ports, so as to output optical signals inputted into the first port toward the second port while outputting optical signals inputted into the second port toward the third port; and the filter configured to transmit an optical signal having a particular wavelength from among optical signals input from the second port of the optical circulator toward the electric field absorption modulator and reflecting the remaining optical signals into the second port of the optical circulator, and input the optical signal from the electric field absorption modulator into the second port of the optical circulator.

3. The remote antenna unit as claimed in claim 1, further comprising an antenna converting radio signals into the second electric data signal and converting first electric data signal from the electric field absorption modulator into a radio signal.

4. The remote antenna unit as claimed in claim 1, wherein the electric field absorption modulator includes:
an active layer in which the optical signal propagates;
upper and lower clad layers between which the active layer is interposed, for locking the optical signals in the active layer;

a reflective layer stacked on the second end of the electric field absorption modulator; and an electrode stacked on the upper clad layer, for inputting/outputting the first and second electric data signals.

5. A radio-over-fiber network comprising:

a base station including an optical transmission portion for transmitting downstream optical signals having different wavelengths, and an optical reception portion for receiving upstream optical signals having different wavelengths; and a plurality of remote antenna units connected sequentially to the base station through optical fibers so as to be in a loop structure, each of remote antenna unit including:

an optical circulator having a plurality of ports;

an electric field absorption modulator having a first input/output end and a second reflective end, the electric field absorption modulator configured to demodulate an optical signal into a first data signal and modulate the demodulated optical signal according to a second electric data signal; and a filter disposed between the optical circulator and the electric field absorption modulator, the filter configured to transmit an optical signal having a particular wavelength from among optical signals input from a port of the optical circulator toward the electric field absorption modulator and reflecting the remaining optical signals into the port of the optical circulator, and input the optical signal from the electric field absorption modulator into the port of the optical circulator.

6. The radio-over-fiber network as claimed in claim 5, further including an antenna which converts radio signals into the second electric data signal and converts first electric data signals from the electric field absorption modulator into a radio signal.

7. The radio-over-fiber network as claimed in claim 5, wherein the electric field absorption modulator includes:
    an active layer in which the optical signal propagates;
    upper and lower clad layers between which the active layer is interposed, for locking the optical signal in the active layer;
    a reflective layer stacked on the second end of the electric field absorption modulator; and
    an electrode stacked on the upper clad layer, for inputting/outputting the first and second electric data signals.

8. The radio-over-fiber network as claimed in claim 5, wherein the upstream and downstream optical signals propagate in the optical fiber in an identical direction.

9. The radio-over-fiber network as claimed in claim 5, wherein the optical transmission portion of the base station includes:
    a plurality of optical transmitters to output the downstream optical signals; and
    a first wavelength multiplexer to perform wavelength division multiplexing with relation to the downstream optical signals.

10. The radio-over-fiber network as claimed in claim 9, wherein the first wavelength multiplexer transmits the multiplexed downstream optical signals toward the remote antenna units.

11. The radio-over-fiber network as claimed in claim 5, wherein the optical reception portion of the base station includes:
    a plurality of optical receivers to receive the upstream optical signals; and
    a second wavelength division multiplexer to perform wavelength division multiplexing with relation to the upstream optical signals from the remote antenna units.

12. The radio-over-fiber network as claimed in claim 11, wherein a second wavelength division multiplexer transmits the multiplexed upstream optical signals toward the optical receivers.

* * * * *